United States Patent [19]

Fahrion

[11] Patent Number: 4,664,253
[45] Date of Patent: May 12, 1987

[54] CHAIN CONVEYING UNIT

[76] Inventor: Otmar Fahrion, Iltisweg 31, D-7014 Kornwestheim, Fed. Rep. of Germany

[21] Appl. No.: 699,419

[22] Filed: Feb. 5, 1985

[30] Foreign Application Priority Data

Jun. 10, 1983 [DE] Fed. Rep. of Germany ....... 3321018

[51] Int. Cl.⁴ .............................................. B65G 17/06
[52] U.S. Cl. .................................... 198/851; 474/145; 198/463.3; 198/803.01; 198/841
[58] Field of Search ............... 198/851, 852, 631, 343, 198/346.3, 463.3, 841, 803.01, 831; 474/100, 145

[56] References Cited

U.S. PATENT DOCUMENTS

| 1,725,467 | 8/1929 | Marble | 198/852 X |
| 1,939,862 | 12/1933 | Preble | 198/841 |
| 2,954,113 | 9/1960 | Hibbard et al. | 198/851 X |
| 3,034,638 | 5/1962 | Franz | 198/851 |
| 3,738,478 | 6/1973 | Tourtellotte | 198/851 |
| 4,024,948 | 5/1977 | Persson | 198/839 X |

FOREIGN PATENT DOCUMENTS

| 2518776 | 11/1976 | Fed. Rep. of Germany | 198/841 |
| 809430 | 3/1937 | France | 198/851 |
| 1018248 | 12/1952 | France | 474/145 |
| 740640 | 6/1980 | U.S.S.R. | 198/631 |

Primary Examiner—Joseph E. Valenza
Assistant Examiner—Jonathan D. Holmes
Attorney, Agent, or Firm—Fred Philpitt

[57] ABSTRACT

A conveying unit for a pallet conveyor has a link chain (24), on whose pins (40) there has been placed a respective carrying cap (26). The carrying caps (26) have a U-shaped transversal section and sit with their legs (44) on the chain pins (40). The carrying element (26) end surfaces (52, 54) which are to the front and rear as viewed in the transport direction are shaped so as to be convexly cylindrical and concavely cylindrical respectively, the axes of the cylindrical surfaces coinciding with a respective pin axis.

4 Claims, 5 Drawing Figures

CHAIN CONVEYING UNIT

The invention relates to a chain conveying unit.

There are known conveyors for pallets which have two conveying chains which are arranged in a horizontal transport plane and which run parallel to each other at a distance from each other. The joint pins of the chain are aligned perpendicularly to the conveying chain. Outside the external chain sideplates there are provided laminar carrying links, of which the lower one runs, in sliding contact, on a supporting surface of the conveyor frame, while the upper one supports one end of a pallet (the other pallet end is carried by the upper carrying laminae of the second conveying unit arranged at a distance). The faces of the carrying laminae which are to the front and rear as viewed in the transport direction are designed so as to be convexly cylindrical and concavely cylindrical respectively, the axes of these cylindrical surfaces coinciding with pin axes of the chain. In this way, the carrying laminae can form a substantially continuous surface even if the transport path has curves.

Such pallet conveyors have the disadvantage that the transport path in the transport plane has always to be closed. Such pallet conveyors thus require a great deal of space. Furthermore, slipping inevitably occurs in curves of the transport path, since the two conveying chains arranged at a distance from each other travel distances which differ in length. Another disadvantage of these known pallet conveyors is the fact that one cannot change the distance between the two conveying units, since the deflection units provided at the curves of the transport path (e.g. deflection rails or deflection wheels) are only fitting for exactly one distance between the conveying units.

The afore-mentioned difficulties are not encountered with roller conveyors. But these have the disadvantage that there exists only a line contact between the conveyed material and the conveying means so that no appreciable forces can be exerted for accelerating and braking the conveyed material. However, it is precisely in production lines that an intermittent further movement of pallet carried workpieces from one work station to the next is very important.

It is the object of the present invention to develop a chain conveying unit to that effect that a pallet conveyor made up by using such conveying units can be easily converted to pallets of different widths and there nevertheless continues to exist on a continuous transport surface an areal contact with the conveyed pallets.

According to the invention, this problem is solved by a chain conveying unit as described herein after.

In the case of the chain conveying unit according to the invention, the joint pins of the conveying chain are parallel to the carrying surfaces of the carrying links, since the latter are now designed as caps with legs receiving the pins of the chain and with a carrying section connecting the legs. For normal use, the carrying sections are substantially horizontally aligned so that the conveying chain revolves around deflection wheels with a horizontal axis. Each conveying unit thus has an upper working strand, whose continuous entrainment surface is formed by the tops of the carrying caps, as well as a return strand located therebeneath. Such conveying units can be easily moved towards and away from one another so as to take into account different pallet widths without any slipping having to be accepted at any point of the transport path.

Another advantage of the conveying unit according to the invention is to the effect that the conveying chain is reliably protected by the carrying caps from three sides against the ingress of foreign bodies and contaminants.

The development of the invention also ensures that even if the deflection wheels have a relatively small diameter a good encapsulation of the conveying chain is brought about, since the individual carrying caps are small in dimension viewed in the transport direction.

The development of the invention also ensures that the pallets are positioned in a particularly precise manner in the direction which is perpendicular to the transport plane, since the weight is transmitted directly via the rigidly designed carrying caps to the frame of the conveyor. At the same time, the conveying chain itself does not have to withstand the sometimes very high weight forces of the moved loads. In the case of the known conveying units with pin axes aligned perpendicularly to the transport plane the pins, sideplates and bushings of the conveying chain are by contrast simultaneously force-transmitting parts in supporting the conveyed material.

The development of the invention further ensures that the pallets can be transported with only little friction on the path between work stations when exact positioning is less important.

Hereinafter, the invention will be explained in more detail with the aid of exemplified embodiments and with reference to the drawings, in which.

Figure 1:
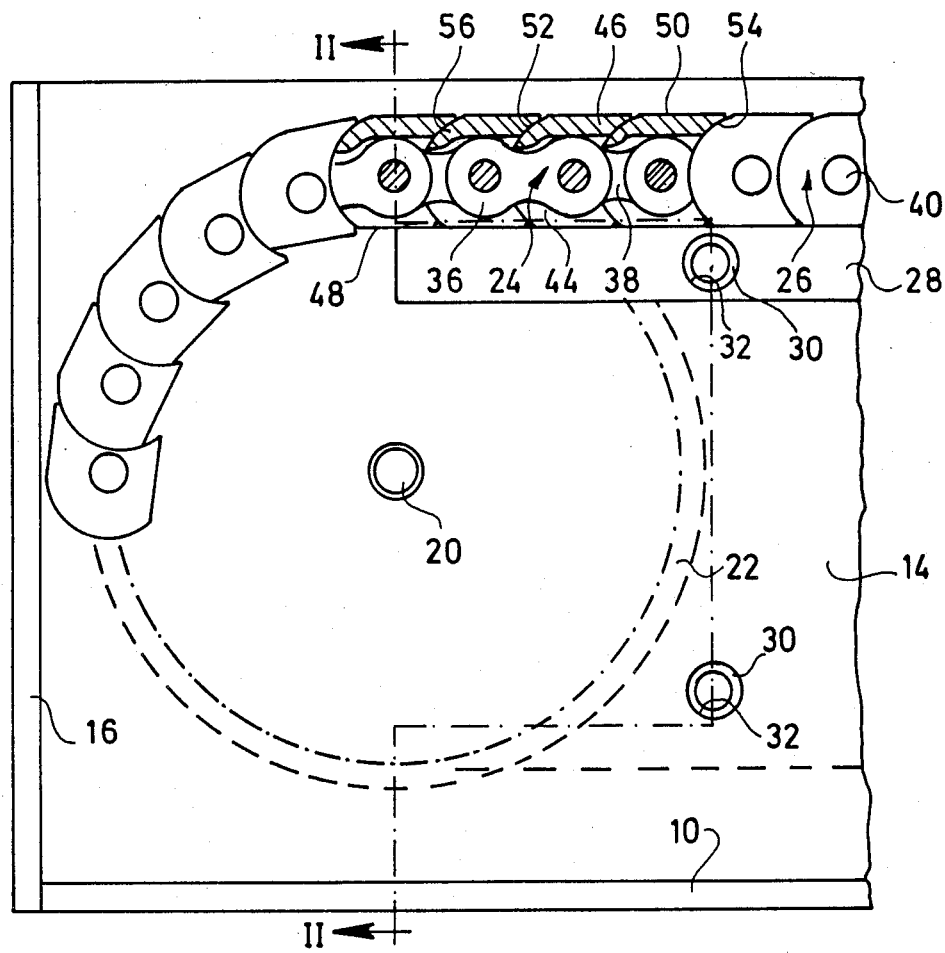
FIG. 1 shows a lateral view of a portion of a conveying unit of a pallet conveyor which is adjacent to one of the deflection wheels for the conveying chain, one lateral cheek plate of the frame of the conveying unit having been removed.
Figure 2:
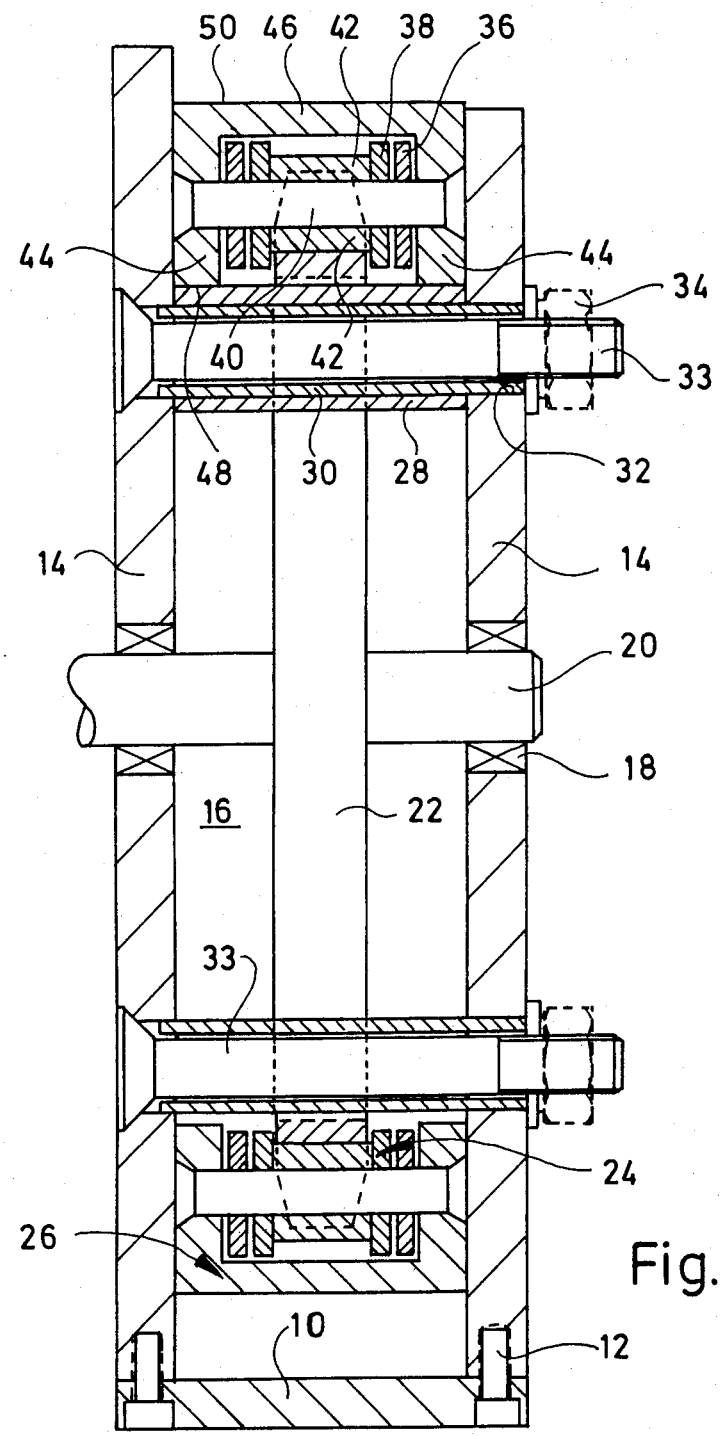
FIG. 2 shows a vertical section through the conveying unit shown in FIG. 1 along the angled line of intersection II—II.
Figure 3:
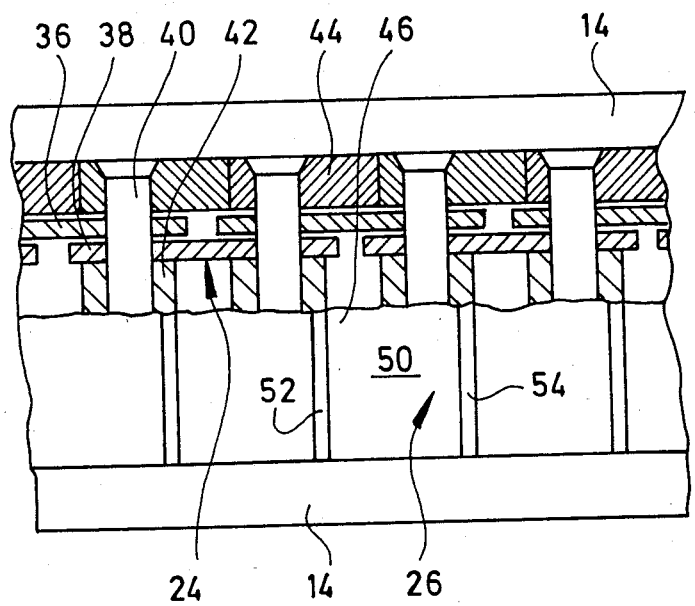
FIG. 3 shows a top view of a portion of the upper working strand of the conveying unit shown in FIG. 1, parts of carrying caps having been broken away.

The conveying unit shown in FIGS. 1 to 3, and which together with an identically designed conveying unit arranged at a lateral distance therefrom forms a pallet conveyor, has a base plate 10, on which two lateral cheek plates 14 are fastened by means of screws 12. The cheek plates are stiffened and tightly connected by an end plate 16 located therebetween.

In the cheek plates 14 there is mounted via bearings 18 a shaft 20 of a sprocket wheel 22, over which there runs a link chain designated 24 as a whole. Only a few chain links thereof are shown in detail. For the rest, the chain has been indicated by a broken line.

The link chain 24 carries a plurality of carrying caps 26 which butt against one another in a flush manner and which, in the zone of the top strand of the link chain 24, are supported by a frame-fixed supporting plate 28.

The supporting plate 28 serves as the upper distance piece between the cheek plates 14 and there extend therethrough carrying sleeves 30 which are received in bores 32 in the cheek plate 14. Through the carrying sleeves 30 there extend in turn threaded bolts 33 which, together with nuts 34, serve for securing the cheek plates 14 in place. The lower ends of the cheek plates are held together in a similar manner.

As can be seen particularly clearly in FIGS. 1 and 2, two external sideplates 36 and two internal sideplates 38 as well as pins 40 belong to each chain link. The pins 40 sit in the external sideplates 36 with an interference fit and articulatedly carry the internal sideplates 38. The latter are kept at a specified distance by bushings 42 located therebetween.

As can be seen best in FIG. 2, the pins 40 extend beyond the external sideplates 36 and pass through legs 44 of the carrying caps 26. The legs 44 are connected by a carrying section 46 in such a way that the carrying caps have a transversal cross-sectional profile in the shape of a rectangular U. The other surfaces of the legs 44 are plane-parallel and fit with sliding play between the insides of the cheek plates 14.

At the lower ends in FIGS. 1 and 2, the legs 44 are provided with large sliding surfaces 48 which extend parallel to the linkwise large tops 50 of the carrying sections 46. The sliding surfaces 48 thus form a substantially continuous sliding surface which is in contact with the top of the supporting plate 28, whilst the tops 50 together form a continuous carrying surface, on which one end of a pallet can be supported and be taken along by frictional contact.

Viewed in a sectional plane that is perpendicular to the transport plane and contains the transport direction (see FIG. 1), the carrying caps 26 each have a convexly curved cylindrical face 52 and a complementarily concavely curved cylindrical face 54. The axis of the convex face 52 coincides with the axis of the pin 40 which extends through the legs 44 of a considered carrying cap 26. The axis of the concave face 54 of a considered carrying cap coincides with the axis of the next adjacent of the pins 40.

The faces 52 and 54 relate equally to the legs 44 and the carrying section 46. Integrally formed with the latter and with the legs 44 is simultaneously an inwardly drawn sealing bridge 56 so as to maintain sealing even if the conveying chain is curved to a considerable extent.

It can be clearly seen in FIGS. 1 and 2 that the carrying caps 26, together with the cheek plates 14, ensure in a very simple manner a complete encapsulation of the link chain 24. At the same time, a good areal contact with pallets to be conveyed is ensured. The weight of the latter is transmitted via the carrying caps 26 to the supporting plate 28, distributed over a large surface. At the same time, it is ensured that the pallets are very exactly positioned in the vertical direction, since the carrying caps 26 are rigid parts, for example high-quality castings.

In the case of the conveying unit described above with reference to FIGS. 1 to 3, the link chain 24 equipped with the carrying caps 26 is movable in both directions perpendicularly to the transport plane. One can therefore provide, instead of a supporting plane 28 which is continuous, supporting plates arranged at different levels, and more especially one can insert between frame-fixed supporting plates a vertically adjustable lift plate so as to deposit a conveyed pallet at a work station on a rigid machine table. Such a vertically movable lift plate is designated 58 in FIG. 4. It can be moved upwards or downwards by a drive not shown in detail according to the arrow 60. The lift plate 58 is connected via hinged transition plates 62 to laterally arranged frame-fixed supporting plates 28.

Figure 4:
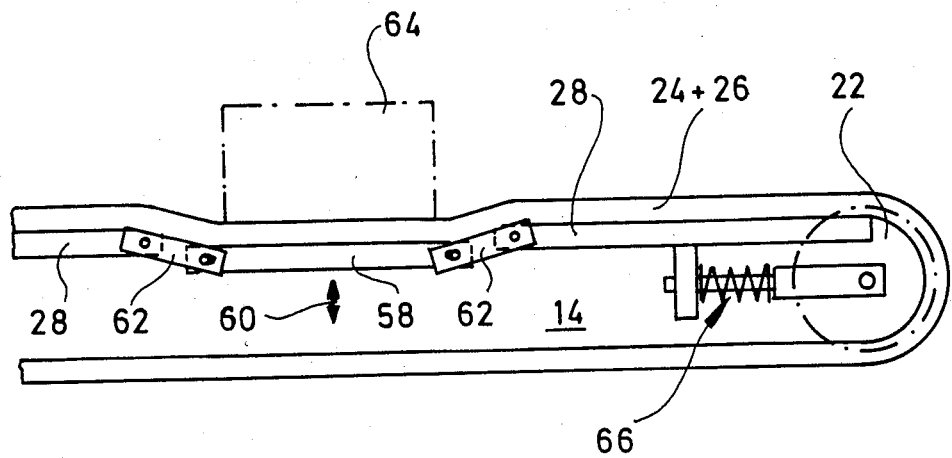
FIG. 4 shows a diagrammatical lateral view of a portion of a modified conveying unit.

In FIG. 4, there is furthermore diagrammatically indicated at the lift plate a pallet 64 on which a workpiece is loaded. In order to allow the changes in the length of the link chain 24 occurring during the lifting or lowering of the lift plate 58 to be absorbed, there is associated with the sprocket wheel 22 on the right-hand side in FIG. 4 a tensioning device 66 which has been diagrammatically indicated as a spring housing.

Figure 5:
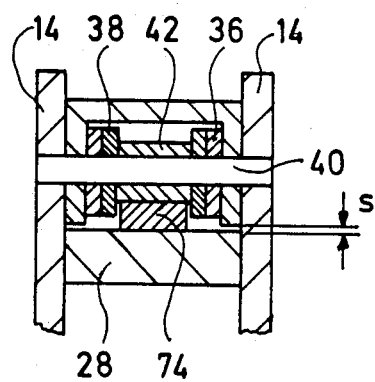
FIG. 5 shows a transversal section through a further modified conveying unit, which is a modification of the upper part of FIG. 2.

FIG. 5 shows a modification of the exemplified embodiment shown in FIGS. 1 to 3, which renders possible conveying with reduced friction. For this purpose, there is provided on the supporting plate 28 a running rail 74 which can be introduced between the internal sideplates 38 of the link chain 24 so that the bushings 42 run on the running rail 74.

I claim:

1. A chain conveying unit intended for use in a pallet conveyor and comprising in combination
   (a) a support means,
   (b) a link chain that is supported by said support means and which comprises a plurality of side plates linked together by pins, and
   (c) a plurality of carrying caps that are mounted in adjacent sequence on said link chain,
   (d) each pin having a carrying cap connected thereto,
   (e) each carrying cap being generally U-shaped when considered in transverse section and including a flat upper load supporting surface and spaced apart legs depending downwardly at right angles from the lateral extremities of said flat upper surface, said downwardly depending legs having flat lower sliding surfaces which are parallel to said flat upper load supporting surface of said carrying cap, the outer surfaces of said spaced apart legs being disposed outwardly at least as far as the ends of said pins so that the conveying unit can move in either a horizontal plane or a plane perpendicular thereto without the need for modification of the chain conveying unit,
   (f) the forward surface of one leg of one carrying cap and the rear surface of the leg of the next adjacent carrying cap being complementary cylindrical surfaces having axes that coincide with the adjacent pins to which they are attached,
   (g) the forward and rear portions of each carrying cap being open to accommodate said link chain except for a leading and trailing transverse edge portion extending between the legs which have curvatures coinciding with the curvatures of the leg portions to which they are joined.

2. A conveying unit as set forth in claim 1 wherein said carrying caps (26) have convexly curved end surfaces (52) and have near these convexly curved end surfaces a sealing bridge (56) which is drawn inwardly towards the link chain (24) and connects the cap legs (44) and whose top is a smooth continuation of said convexly curved surface (52).

3. A chain conveying unit as set forth in claim 1 wherein a running rail (74) extends along a portion of said support means 28, said running rail (74) engaging between side plates (36, 38) of the chain links and cooperating with the chain bushings (42), the height of the running rail being dimensioned to be such that said lower sliding surfaces (48) of the legs of the carrying caps (26) come clear of said support means (28).

4. A conveying chain intended for use in connection with a pallet conveyor and comprising in combination (a) a link chain that is adapted to be supported by a support means and which comprises a plurality of side plates linked together by pins, and
(b) a plurality of carrying caps that are mounted in adjacent sequence on said link chain,
(c) each pin having a carrying cap connected thereto,
(d) each carrying cap being generally U-shaped when considered in transverse section and including a flat upper load supporting surface and spaced apart legs depending downwardly at right angles from the lateral extremities of said flat upper surface, said downwardly depending legs having flat lower sliding surfaces which are parallel to said flat upper load supporting surface of said carrying cap, the outer surfaces of said spaced apart legs being disposed outwardly at least as far as the ends of said pins so that the conveying chain can move in either a horizontal plane or a plane perpendicular thereto without the need for modification of the conveying chain,
(e) the forward surface of one leg of one carrying cap and the rear surface of the leg of the next adjacent carrying cap being complementary cylindrical surfaces having axes that coincide with the adjacent pins to which they are attached,
(f) the forward and rear portions of each carrying cap being open to accommodate said link chain except for a leading and trailing transverse edge portion extending between the legs which have curvatures coinciding with the curvatures of the leg portions to which they are joined.

* * * * *